(12) United States Patent
Schmid et al.

(10) Patent No.: US 12,544,901 B2
(45) Date of Patent: Feb. 10, 2026

(54) HAND-HELD PROCESSING TOOL

(71) Applicant: Robert Bosch GmbH, Stuttgart (DE)

(72) Inventors: Lars Schmid, Nuertingen (DE); Joerg Kaiser, Markgroeningen (DE); Tobias Bayha, Walddorfhaeslach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/586,934

(22) Filed: Feb. 26, 2024

(65) Prior Publication Data

US 2024/0293925 A1  Sep. 5, 2024

(30) Foreign Application Priority Data

Mar. 1, 2023 (DE) ...................... 10 2023 201 866.7

(51) Int. Cl.
 B25F 5/00 (2006.01)
 B23B 45/02 (2006.01)

(52) U.S. Cl.
 CPC .............. *B25F 5/006* (2013.01); *B23B 45/02* (2013.01)

(58) Field of Classification Search
 CPC .................................. B25F 5/006; B23B 45/02
 See application file for complete search history.

(56) References Cited

U.S. PATENT DOCUMENTS

| | | | | |
|---|---|---|---|---|
| 4,392,661 A * | 7/1983 | Langenstein | ............. | B25F 5/00 429/100 |
| 5,565,719 A * | 10/1996 | Kuhlmann | ................ | B25F 5/02 310/47 |
| 5,595,532 A * | 1/1997 | McCracken | ............... | B25F 5/02 451/357 |
| 5,692,574 A * | 12/1997 | Terada | ................. | B25D 17/043 173/162.2 |
| 6,393,701 B1 * | 5/2002 | Fuchs | .................... | B23D 51/02 30/392 |
| 7,004,357 B2 * | 2/2006 | Shew | .................... | G01F 11/029 222/256 |
| 7,235,005 B2 * | 6/2007 | Schnell | ................... | B24B 23/06 451/344 |
| 7,794,308 B2 * | 9/2010 | Wuensch | ................ | B24B 23/00 451/344 |
| 11,491,633 B2 * | 11/2022 | Cerfeuillet | ............... | G08B 5/36 |
| 2004/0148789 A1 * | 8/2004 | Gist | .......................... | B25F 5/02 30/392 |
| 2006/0033290 A1 * | 2/2006 | Fuchs | .................... | F16J 15/061 173/217 |
| 2007/0180710 A1 * | 8/2007 | Moore | ................... | B27G 19/04 30/391 |

(Continued)

FOREIGN PATENT DOCUMENTS

| | | |
|---|---|---|
| DE | 34 13 233 A1 | 11/1985 |
| DE | 10 2021 209 180 A1 | 2/2023 |
| EP | 4 056 286 A1 | 9/2022 |

*Primary Examiner* — Lucas E. A. Palmer
(74) *Attorney, Agent, or Firm* — Maginot, Moore & Beck LLP

(57) ABSTRACT

A hand-held processing tool with a housing that includes at least two housing parts is disclosed. The housing parts each have a side edge which are directly adjacent to one another in the assembled state of the housing. A recess is provided in at least one partial region of the side edges of at least one of the two housing parts such that the side edges of the at least two housing parts are spaced apart from one another in the at least one partial region.

20 Claims, 6 Drawing Sheets

(56) References Cited

U.S. PATENT DOCUMENTS

| | | | |
|---|---|---|---|
| 2007/0246237 A1* | 10/2007 | Homsi | B25F 5/006 173/213 |
| 2008/0053676 A1* | 3/2008 | Baumann | B25F 5/02 173/217 |
| 2009/0134191 A1* | 5/2009 | Phillips | B25F 5/02 362/183 |
| 2009/0145617 A1* | 6/2009 | Duesselberg | B25D 16/006 173/48 |
| 2013/0199811 A1* | 8/2013 | Maddilate | B25F 5/02 173/170 |
| 2014/0124230 A1* | 5/2014 | Johnson | B25F 5/02 173/162.1 |
| 2017/0225316 A1* | 8/2017 | Iwakami | B25F 5/02 |
| 2018/0283508 A1* | 10/2018 | Aoki | B25F 5/006 |
| 2019/0381649 A1* | 12/2019 | Peng | B25F 5/02 |
| 2022/0088763 A1* | 3/2022 | Bathke | B25F 5/026 |

\* cited by examiner

HAND-HELD PROCESSING TOOL

This application claims priority under 35 U.S.C. § 119 to patent application no. DE 10 2023 201 866.7, filed on Mar. 1, 2023 in Germany, the disclosure of which is incorporated herein by reference in its entirety.

The disclosure relates to a hand-held processing tool with a housing that includes at least two housing parts.

BACKGROUND

In order to reduce the vibrations of a hand-held processing tool acting on an operator during a machining operation, the rigidity and oscillating behavior of the hand-held processing tool must generally be matched to its mass and the oscillations emitted. Particularly in the case of housings consisting of multiple housing parts, deformation and friction can occur at the directly adjacent and touching side edges between the housing parts. These deformations cause the housing parts to actively press against each other in the deformation region and thus stiffen them, so that any compressive stresses cannot be relieved and the vibrations are amplified.

The housings of hand-held processing tools often consist of two half shells. DE 10 2021 209 180 A1 discloses a hand-held processing tool in the form of a drill hammer, the housing of which is formed from two half-shells that are held together by means of screw connections. A main handle for guiding the drill hammer is formed by the two half shells of the housing, which are designed as handle shells, and is at least partially surrounded by a soft component.

It is the task of the disclosure to reduce the vibrations occurring during a machining operation with a hand-held processing tool at a connection point of at least two housing parts of a housing of the hand-held processing tool.

SUMMARY

To solve the task, it is provided that a recess is provided in at least one partial region of the side edge of at least one of the two housing parts in such a way that the side edges of the at least two housing parts are spaced apart from one another in the at least one partial region. The recess thus ensures that the at least two housing parts, in particular the side edges, are not in direct contact with each other in the partial region. In this way, the degrees of freedom of the two housing parts in relation to each other can be increased, so that a stiffness adjustment of the resulting mass-spring system is optimized to reduce any vibrations. The at least one recess can be designed as a separating slot, separating joint, separating gap or the like between the housing parts. It is also conceivable to provide a recess in at least one partial region on the side edges of all adjacent housing parts in order to achieve a symmetrical design and possibly improved vibration damping. It should be noted that more than two housing parts can be directly adjacent to one another The housing parts of the housing can be designed as half shells. Since any vibrations are transmitted to an operator, particularly in a grip area of the housing of the hand-held processing tool, it is also provided that the half-shells are each partially designed as handle shells that form a handle for guiding the processing tool.

The term "hand-held processing tools" should be understood to mean, inter alia, battery-powered and/or mains-operated hand-held power tools for processing workpieces by means of a motor-driven insert tool, such as a drill, a chisel, a grinding or polishing disc, a saw blade, a knife or the like. The disclosure can also be applied to hand-held processing tools which are driven by an internal combustion engine or by means of compressed air or the like. Typical hand-held power tools in this context are screwdrivers, impact drills, drill hammers, demolition hammers, chisels, planers, angle grinders, orbital sanders, polishers, nailers or the like. Garden and construction tools such as lawn trimmers, branch saws, tilling and trenching machines, blowers or the like can also be considered as hand-held processing tools. Furthermore, the disclosure is applicable to hand-held household appliances such as vacuum cleaners, blenders, etc.

In battery-powered processing tools, both permanently installed and replaceable battery packs can be used, the battery voltage of which is generally a multiple of the voltage of an individual energy storage cell and which results from the interconnection (parallel or series) of the energy storage cells. The energy storage cells are preferably designed as lithium-based energy storage cells, e.g., Li-ion, Li-po, Li-metal, or the like. However, rechargeable batteries or removable battery packs with Ni—Cd, Ni-MH cells or other suitable cell types can also be used. For common Li-Ion energy storage cells with a cell voltage of 3.6 V, examples of voltage classes are 3.6 V, 7.2 V, 10.8 V, 14.4 V, 18 V, 36 V, etc. It should also be noted that the design of the electromechanical interfaces of a removable battery pack and the processing tool, as well as the associated receptacles for frictional and/or interlocking releasable connection, are not intended to be the subject matter of this disclosure. A skilled person will select a suitable embodiment for the battery pack interface depending on the power or voltage class of the processing tool and/or the removable battery pack. The embodiments shown in the drawings are therefore only to be understood by way of example.

The at least one partial region is a deformation region which tends to deform elastically during operation of the hand-held processing tool. In this context, the tendency of elastic deformation should be understood to mean that at least one of the housing parts can deform in different directions during operation with the hand-held processing tool, depending on the intensity of the machining operation, in such a way that tension occurs between the housing parts at their connection points, in particular the touching side edges. As already described at the beginning, these deformations can cause the housing parts to actively press against each other in the deformation region and thus stiffen them, so that any compressive stresses are not relieved and the vibrations are amplified. Depending on the length, depth and design shape of the recess in the at least one partial region, the decoupling geometry according to the disclosure allows the vibration behavior to be optimized both in the direction of the side edges of the adjoining housing parts and in all other conceivable directions. The final design shape therefore depends largely on the geometry and the movement behavior of the housing parts. It is also possible to adapt to the compressive stress regions or the deformation region.

In a further development of the disclosure, it is provided that the recess is at least partially, preferably completely, filled with a soft component, in particular an elastomer. With particular advantage, dust and/or fluids can thus be prevented from entering the hand-held processing tool. In addition, the possibility of a flat surface arises in order to prevent any injuries to the operator, in particular in a grip area of a main handle of the hand-held processing tool. The soft component can, for example, be designed as a thermoplastic elastomer (TPE), which is also typically used for the coating of the handle shells. However, other elastomers with rubber-like deformation characteristics, such as vulcanizates of natural rubber or silicone rubber, are also conceivable as filler for the recess.

With particular advantage, the soft component thus transmits far fewer vibrations when touched by the operator, as it is compressible in contrast to the generally much stiffer material of the housing parts.

Alternatively or additionally, the recess is formed at least partially, preferably completely, as a tongue-and-groove system, in which a first of the at least two housing parts has a tongue in the at least one partial region and a second of the at least two housing parts has a groove complementary thereto in such a way that the tongue and groove overlap and are spaced apart from one another in the assembled state of the housing. An overlap of tongue and groove should be understood to mean that the tongue-and-groove system does not allow a clear view from the outside of the assembled housing into its interior. By spacing the tongue and groove, any compressive stresses in the deformation region between the housing parts can be effectively avoided.

As a rule, the housing parts of the housing are screwed together when assembled. This makes it easier to assemble the entire hand-held processing tool. In addition, the housing can be disassembled more easily, for example, when servicing by loosening the screw connections is required. A reduction in rigidity in the deformation region can be achieved in a particularly advantageous manner by tightening at least one screw connection of the at least two housing parts in the vicinity of the at least one partial region with a lower torque compared to the screw connection of the at least two housing parts away from the at least one partial region. In an advantageous manner, a low clearance of the housing parts, in particular their side edges lying against each other, can thus be achieved in the partial region in order to reduce or even completely avoid the formation of compressive stresses in the deformation region. In the context of the disclosure, the term "in the vicinity" should be understood to mean in particular those screw connections of the housing that are closest to the at least one partial region. Depending on the design of the partial housing and the hand-held processing tool, it can be advisable to tighten one or multiple screw connections with a lower torque, wherein the plurality of all screw connections are tightened with a higher torque.

The screw connections can also be designed such that the first housing part has a plurality of screw bosses and the at least one second housing part has a corresponding plurality of screw sockets, wherein in the assembled state of the housing at least one screw boss and a corresponding screw socket have a defined clearance in the vicinity of the at least one partial region. Furthermore, a soft component, in particular an elastomer, can be arranged between the at least one screw boss and the corresponding screw socket in the vicinity of the at least one partial region. In a particularly advantageous manner, the soft component prevents the screw boss from striking the corresponding screw socket in the event of strong impacts and/or vibrations that act intrinsically or extrinsically on the housing of the hand-held tool.

Alternatively or in addition to the screw connections, at least one latching hook is provided on the first housing part in the vicinity of the at least one partial region and a corresponding rear engagement is provided on the at least one second housing part, wherein the at least one latching hook engages behind the corresponding rear engagement in the assembled state of the housing in such a way that the latching hook and the rear engagement have a defined clearance. The term "in the vicinity" is also intended here to define an environment of the at least one partial region in which the at least one latching hook and the rear engagement corresponding thereto can cause a reduction in vibrations. Depending on the design of the partial housing and the hand-held processing tool, it can be expedient to provide one or more latching hooks and rear engagements according to the disclosure in the vicinity of the at least one partial region.

BRIEF DESCRIPTION OF THE DRAWINGS

The disclosure is explained hereinafter with reference to FIGS. 1 through 8 by way of example, wherein identical reference numbers in the drawings indicate identical components having an identical function.

Shown are.

DETAILED DESCRIPTION

Figure 1:
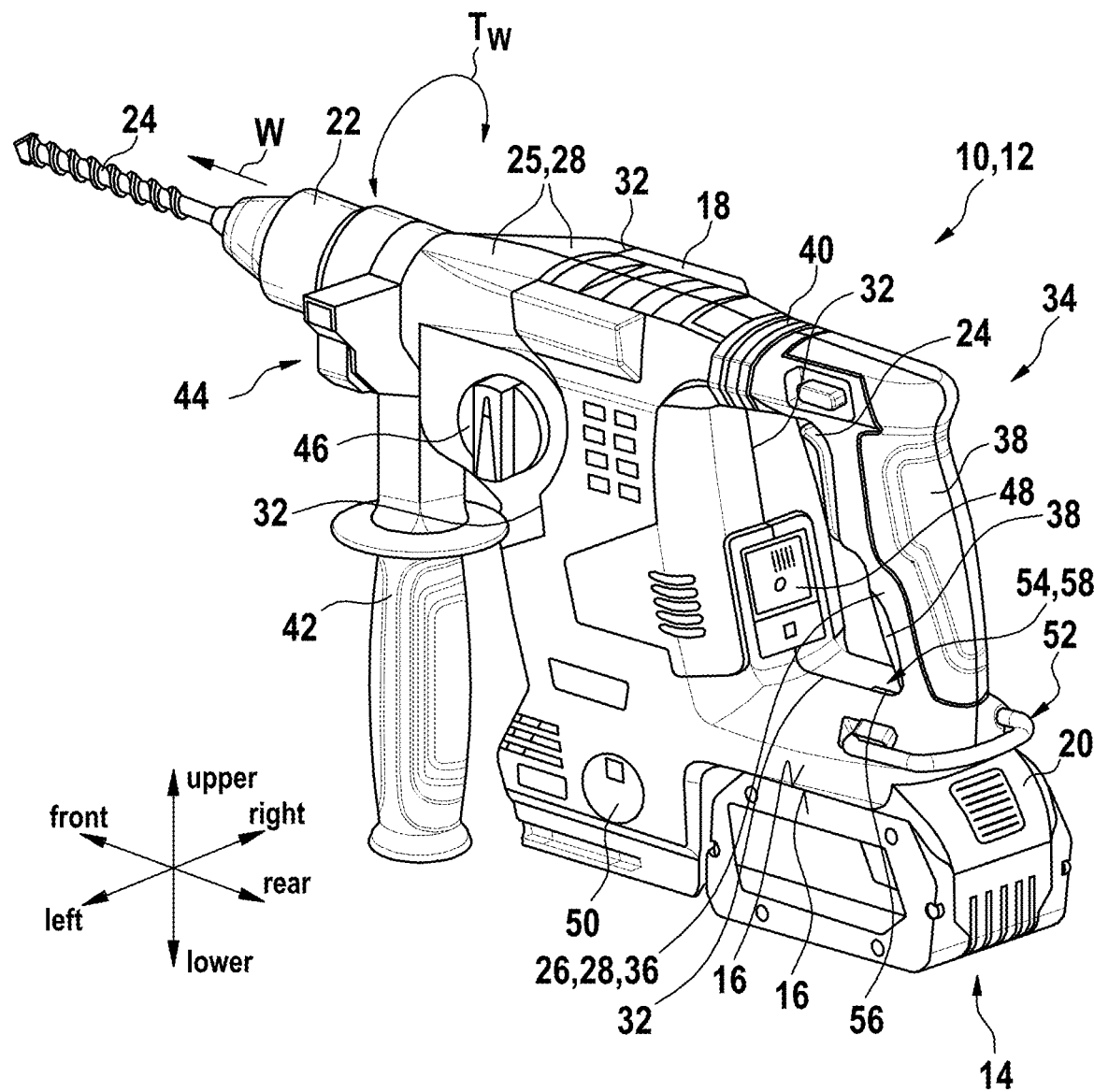
FIG. 1: a perspective view of a first embodiment example of the recess according to the disclosure for a hand-held processing tool designed as a drill hammer.
Figure 2:
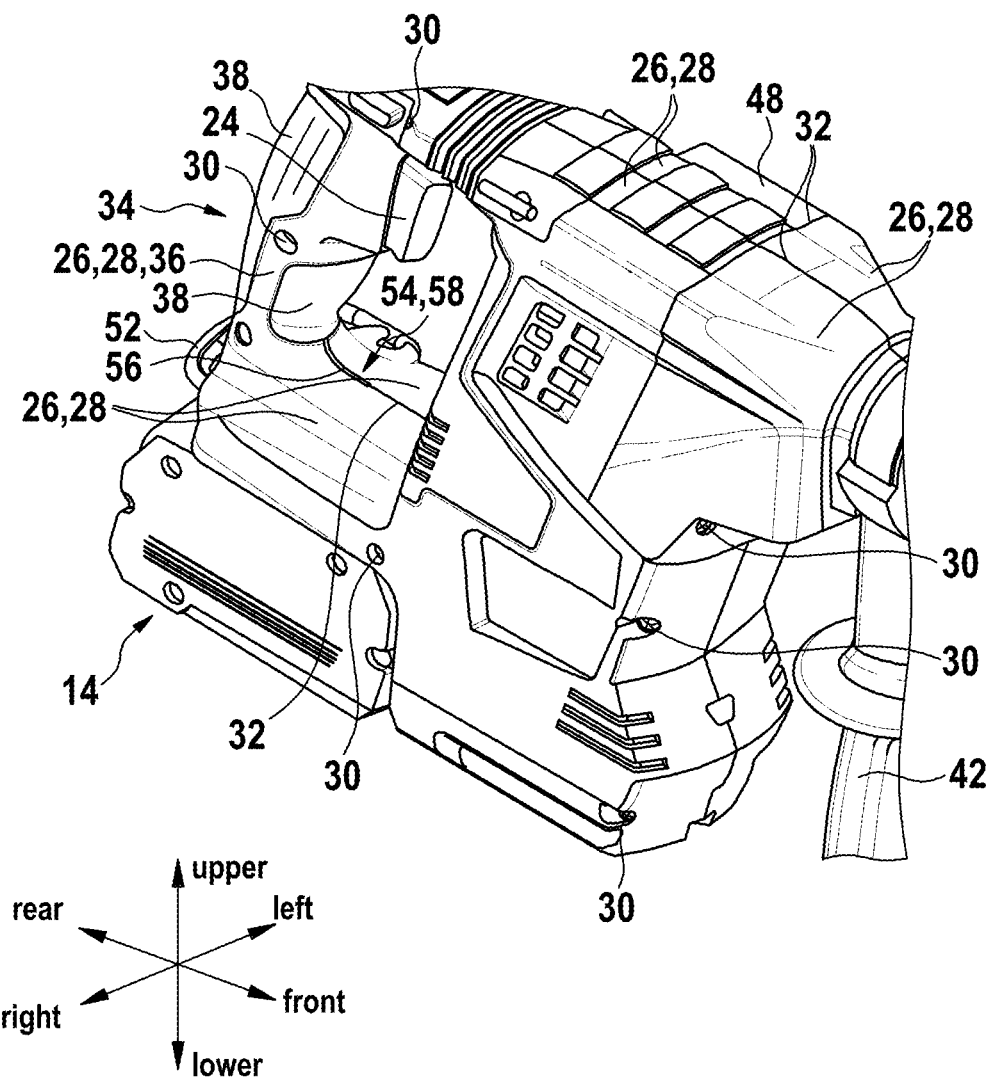
FIG. 2: a perspective view of the first embodiment example of the recess for the drill hammer according to the disclosure in a second view.

FIGS. 1 and 2 show two different views of a hand-held processing tool 12 in the form of a drill hammer 10, which is supplied with energy via a removable battery pack 14. For better orientation, coordinate crosses with the designations "rear", "front", "bottom", "top", "left" and "right" are shown in FIGS. 1 and 2. However, these designations are not to be understood as limiting the disclosure and refer primarily to a main working direction W and thus to the holding of the drill hammer 10 by an operator, in particular during a machining operation.

The removable battery pack 14 can be releasably connected to the drill hammer 10 via correspondingly designed electromechanical interfaces 16 on the removable battery pack 14 or on a housing 18 of the drill hammer 10 in a frictional and/or interlocking manner. For this purpose, an operator can insert and lock the removable battery pack 14 along with its electromechanical interface 16 into the electromechanical counter-interface 16 of the drill hammer 10. It should be noted that the overall design of the electromechanical interfaces 16 of the removable battery pack 14 and the processing tool 12 that can be connected thereto, as well as the associated receptacles for the frictional and/or interlocking releasable connection, are not intended to be the subject of this disclosure. A skilled person will select a suitable embodiment for the interfaces 16 depending on the power or voltage class of the processing tool 12 and/or the removable battery pack 14.

A housing 20 of the removable battery pack 14 has the first electromechanical interface 16 on a first side wall or its upper side for detachable connection to the electromechanical mating counter-interface 16 of the drill hammer 10. The removable battery pack 14 is discharged during operation of the drill hammer 10. As previously mentioned hereinabove, the battery voltage of the removable battery pack 14 generally results from a multiple of the individual voltages of the energy storage cells (not shown) as a function of their connection (in parallel or in series). Preferably, the energy storage cells are designed as lithium-based battery cells, e.g., Li-ion, Li-po, Li-metal, or the like. However, a removable battery pack with Ni—Cd, Ni-MH cells or other suitable cell types is conceivable. The disclosure can also be applied without limitation to a drill hammer 10 operated at grid voltage, e.g. 230 VAC.

The drill hammer 10 comprises a striking mechanism (not shown in greater detail) for driving an insertion tool 24, e.g. a drill bit or a chisel, which can be alternately held in a drill chuck 22. The striking mechanism is driven by an electric motor arranged in a housing 18 with a downstream transmission, which is supplied with energy by power electronics. The power electronics are controlled via a control unit or regulating unit integrated in the drill hammer 10 for regulating or controlling the electric motor, e.g. as a function of a main switch 24 that can be actuated by an operator. The housing 18 of the drill hammer 10 consists of multiple partial housings 26, which are designed as half shells 28 open on one side. The partial housings 26 accommodate the entire drive train of the drill hammer 10 except for the drill chuck 22 and the removable battery pack 14. After assembly of the drill hammer 10, the half shells 28 are held together by a plurality of screw connections 30 at their respective, directly adjacent side edges 32 (see FIG. 2).

The main switch 24 is arranged in a main handle 34 of the drill hammer 10, which is essentially formed from two of the half shells 28 of the housing 18, wherein the two half shells 28 are formed as handle shells 36 in the region of the main handle 34. In addition, the two handle shells 36 are at least partially covered with a soft component 38 on the rear side and below the main switch 24 in order to achieve an improved and more comfortable grip for the operator. The soft component 38 is preferably formed as a thermoplastic elastomer (TPE). Furthermore, the main handle 34 is decoupled from the housing 18 by a attenuating device 40 at its upper part in order to protect the operator from excessive vibrations during longer work processes. The same applies to an additional handle 42 arranged in the vicinity of the drill chuck 22. The operator can rotate this in a tangential direction Tw, relative to a main working direction W of the drill hammer 10 via a tensioning and clamping device 44 and thus adapt it according to their needs. It is also possible to completely remove the additional handle 44.

By means of an operating mode switch 46 located in the housing 18, the operator can switch between different operating modes, such as a drilling mode, a hammer drilling mode, or a chiseling or hammering mode. The operator can also use the main switch 24 to vary the rotational speed and/or torque of the electric motor, and thus of the insertion tool 24 or drill chuck 22, which is operatively connected via the striking mechanism. A Human Machine Interface (HMI) 48 provides the operator with a wide range of information about e.g., the charge level of the connected removable battery pack 14, about the set operating mode as well as about any operating faults, e.g. an excessive temperature or the like. Furthermore, the drill hammer 10 comprises an exchangeable or permanently integrated communication module 50 for exchanging data with an external device (not shown in detail in this case), e.g. a smartphone, a smart watch, a personal computer, a gateway, a cloud server, or the like. The communication module 50 can also be used to make various settings on the drill hammer 10, e.g. activating or deactivating a kickback control mode (KBC) or adaptive speed control from the external device. For this purpose, the communication module 50 exchanges the data via radio, in particular WLAN, Bluetooth, LoRa, Zeegbee, or a comparable data protocol. Between the main handle 34 and the electromechanical battery interface 16 arranged below the main handle 34, the drill hammer 10 comprises a suspension means 52 at its rear end. The suspension means 52 allows the drill hammer 10 to be suspended in the unfolded state on the one hand and the use of a shoulder or safety strap, not shown, in the folded state on the other. A further detailed description of the processing tool 12 designed as a drill hammer 10 is omitted in this case, as this is only of minor importance regarding the disclosure, and the drill hammer 10 is also only to be understood by way of example of various hand-held processing tools 12.

According to the disclosure, a recess 56 is provided in at least one partial region 54 of the side edges 32 of the two housing parts 26 formed as half-shells 28 such that the side edges 32 of the two half-shells 28 are spaced apart from one another in this partial region 54. The partial region 54 represents a deformation region 58 which tends to deform in different directions during operation of the drill hammer 10, depending on the intensity of the machining operation, such that tension occurs between the half-shells 28 at their touching side edges 32. The recess 56 thus has the effect that the two half shells 28 are mutually spaced apart in the partial region 54, so that they do not touch each other in the deformation region 58. In this way, the degrees of freedom of the two half shells 28 relative to each other can be increased, so that a stiffness adjustment of the resulting mass-spring system is optimized to reduce any vibrations.

Figure 3:
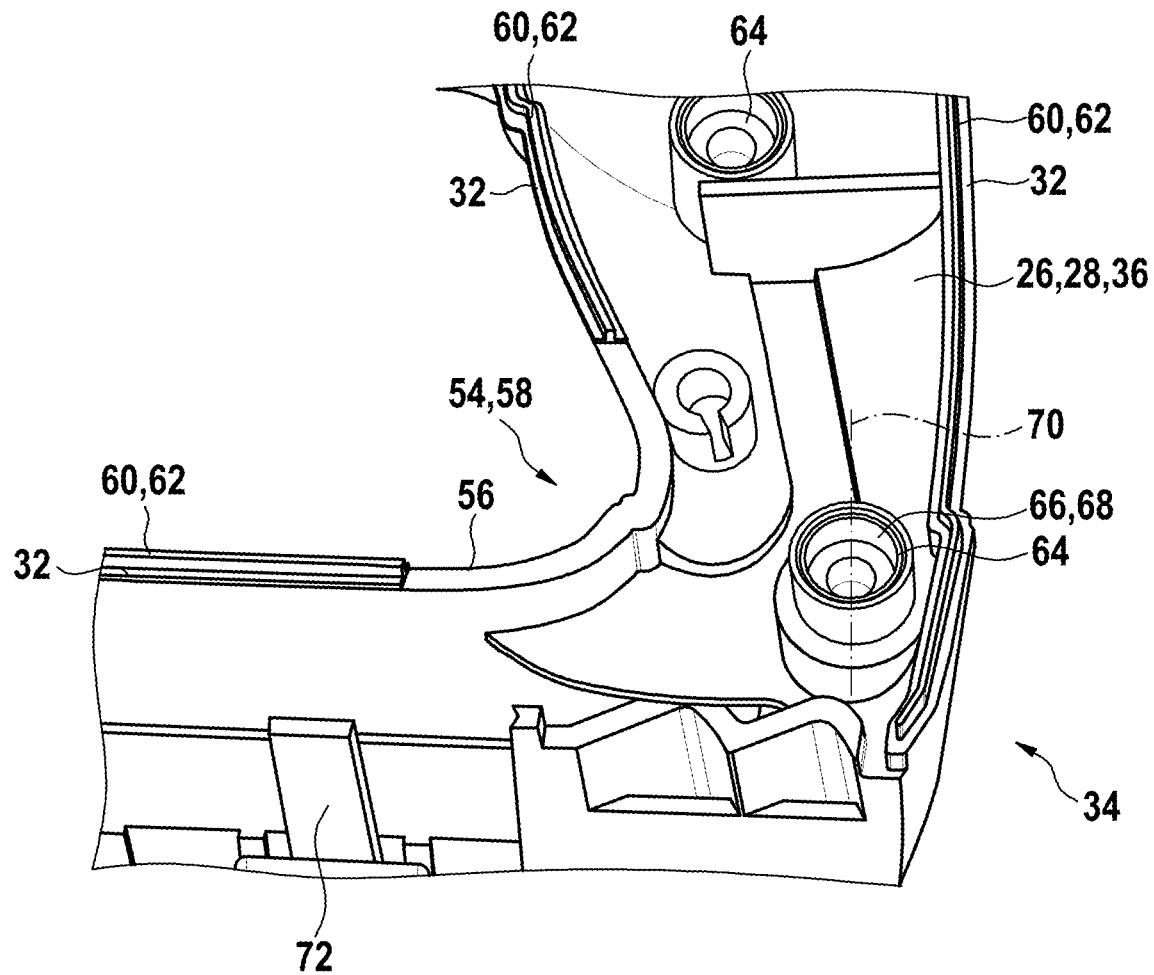
FIG. 3: a detailed perspective view of the first embodiment example of the recess according to the disclosure.

FIG. 3 shows a perspective view of one of the two half shells 28 of the drill hammer 10 formed as a handle shell 36 for the main handle 34. The half shells 28 and handle shell 36 are held at their side edges 32 by a tongue-and-groove system 60 so as to be secured against displacement relative to one another, wherein only the tongue 62 of the tongue-and-groove system 60 provided at the side edge 32 of one half shell 28 and handle shell 36 is shown in FIG. 3. This preferably engages positively in a complementary groove on the side edge 32 of the adjacent half shell 28 or handle shell 36. In the deformation region 58 of the main handle 34, the recess 56 is provided in such a way that the side edges 32 of the two half shells 28 or handle shell 36 are spaced apart from one another. For this purpose, the recess 56 is formed as an elongated depression of the side edge 32, so that neither the tongue 62 nor the side edge 32 of one half shell 28 or handle shell 36 can make contact with the complementary groove and side edge 32 of the adjacent half shell 28 or handle shell 36. Thus, in the assembled state of the housing 18, a separating slot or a separating joint remains in the deformation region 58.

Furthermore, FIG. 3 shows two screw sockets 64 of the one half shell 28 or handle shell 36 in the vicinity of the deformation region 58. These serve the screw connections 30 for fixing the two adjacent half shells 28 or handle shells 36 of the housing 18. Assembly of the housing 18 can be facilitated by the fact that complementary screw bosses of the other, not shown half shell 28 or handle shell 36 engage in the screw sockets 64 of the half shell 28 or handle shell 36 shown. In addition, in addition to the tongue-and-groove system 60, this can prevent or reduce relative displacement of the adjacent half shells 28 or handle shells 36 in the assembled state of the housing 18.

The rigidity in the deformation region 58 can be reduced in a particularly advantageous manner by tightening the screw connection 30 of at least one of the two screw sockets 64 and the complementary screw boss of the two half shells 28 or handle shells 36 in the vicinity of the deformation region 58 with a lower torque compared to the other screw connections 30 of the two half shells 28 or handle shells 36 away from the deformation region 58. Thus, a slight clearance of the two half shells 28 or handle shells 36 in the deformation region 58 can be achieved in order to reduce or even completely avoid the formation of compressive stresses. Furthermore, a soft component 66 is arranged in the screw socket 64 in the vicinity of the deformation region 58 between the screw socket 64 and the corresponding screw boss of the half shell 28 or handle shell 36 not shown. The soft component 66 prevents the screw boss from hitting the screw socket 64 in the event of strong impacts and/or vibrations. For this purpose, the soft component 66 can be designed differently depending on the design and area of application of the hand-held processing tool 12 and the resulting vibrations. In the embodiment example shown, the soft component 66 designed as a hollow cylinder 68 acts only in the radial direction of an axis 70 of the screw connection 30. However, it is also conceivable that the soft component 66 acts both in the radial and in the axial direction or only in the axial direction of the axis 70 of the screw connection 30. In this case, it can additionally or alternatively be designed as a washer or a corresponding end closure of the hollow cylinder. Like the soft component 38 of the main handle 34, the soft component 66 inserted in the at least one screw socket 64 can also be made of a TPE. However, other elastomers with rubber-like deformation characteristics, such as vulcanizates of natural rubber or silicone rubber, are also conceivable.

In addition to the screw connections 30, a latching hook 72 is provided on the half shell 28 or handle shell 36 in the vicinity of the deformation region 58, which engages behind a corresponding rear engagement of the half shell 28 or handle shell 36 not shown in the assembled state of the housing in such a way that the latching hook 72 and the rear engagement have a defined clearance. A defined clearance should be understood to mean that the latching hook 72 and the rear engagement can move relative to one another in the assembled state of the housing 18, in particular axially in the assembly direction (corresponding to the axis 70 of the screw connection 30) of the two half shells 28 or handle shell 36, i.e. do not engage directly with one another in a form-fitting manner. A defined clearance perpendicular to the mounting direction of the two half-shells 28 or handle shells 36 is also conceivable. Instead of a combination of latching hook 72 or rear engagement on the one hand and screw connection 30 or screw socket 64 and screw boss on the other hand, only one of the two fastening means can be used in the vicinity of the deformation region 58.

Figure 4:
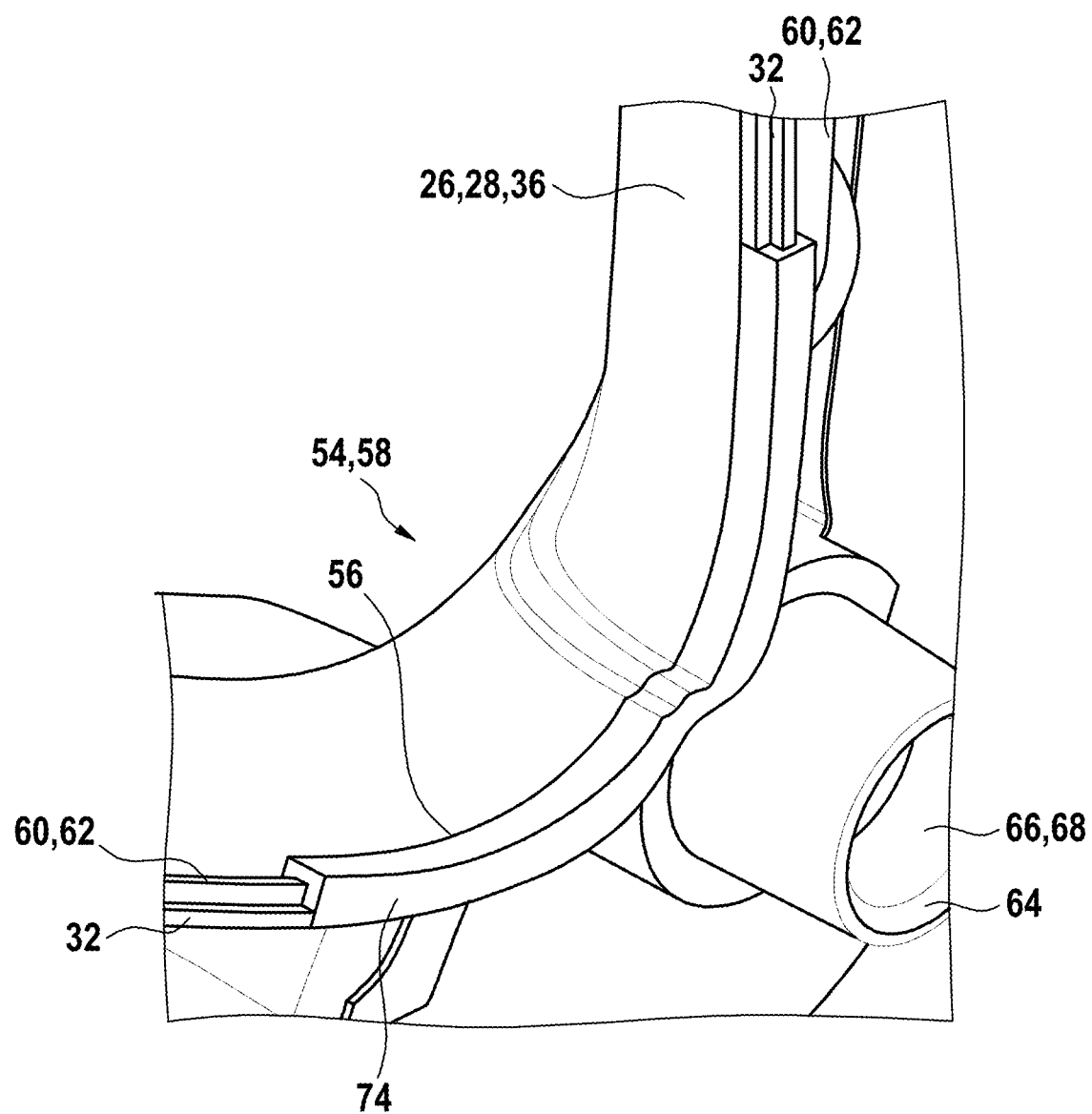
FIG. 4: a detailed perspective view of a second embodiment example of the recess according to the disclosure.
Figure 5:
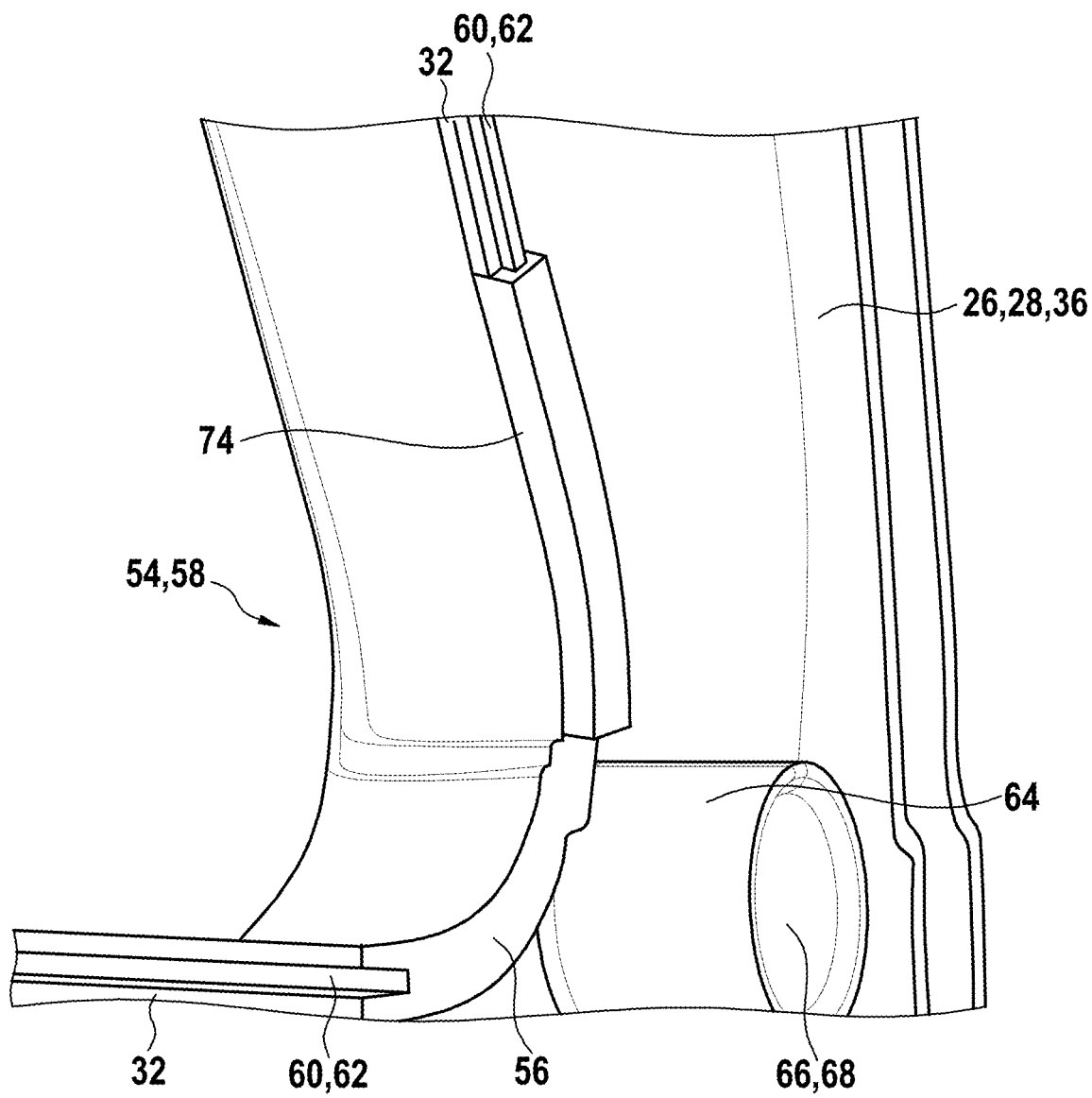
FIG. 5: a detailed perspective view of a third embodiment example of the recess according to the disclosure.

FIGS. 4 and 5 show further embodiment examples of the disclosure. In contrast to FIG. 3, the recess 56 in FIG. 4 is completely filled with a soft component 74. This can be designed as a TPE or another elastomer with comparable material properties in terms of its elasticity and/or impermeability, corresponding to the soft components 38 or 66. With particular advantage, the soft component 72 thus prevents dust and/or fluids from entering the drill hammer 10 through the recess 56. In addition, this results in the possibility of a flat surface in the grip area of the main handle 34 of the drill hammer 10 in order to prevent any injuries to the operator. Furthermore, the soft component 72 transmits less vibration when touched by the operator, as it is compressible in contrast to the generally much stiffer material of the half shells 28 or handle shells 36. Instead of filling the entire recess 56 with the soft component 72, it can alternatively be useful, as shown in FIG. 5, to fill only part of the recess 56 with the soft component 72. In this way, for example, improved vibration damping and/or improved cooling air exchange for electronic components installed in the drill hammer and/or the electric motor of the drive train can be achieved. It is also possible to divide the soft component 72 over the entire length of the recess 56 in such a way that it alternates with corresponding openings.

Figure 6A:
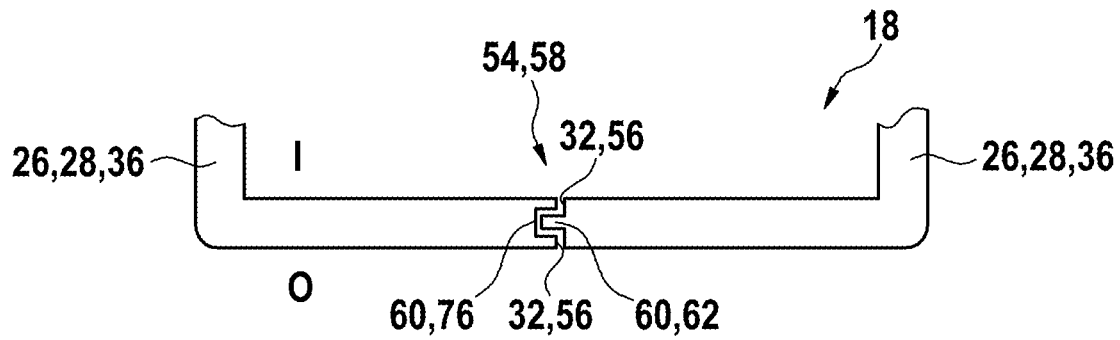
FIG. 6a: a sectional view of a fourth embodiment example of the recess according to the disclosure.
Figure 6B:
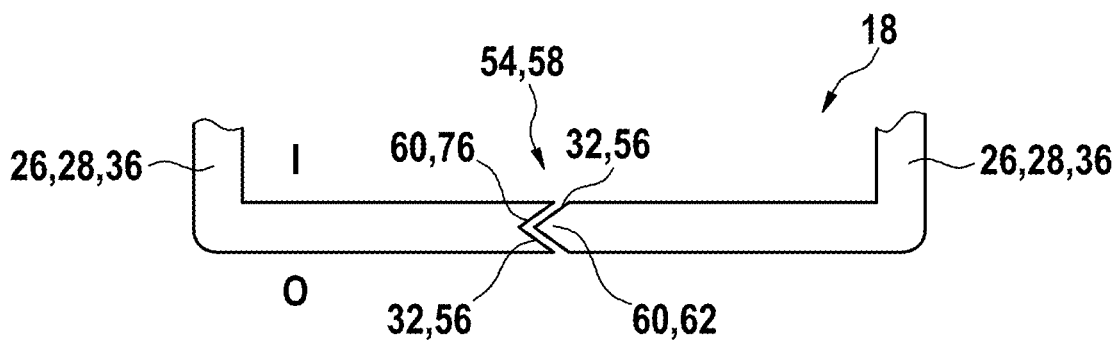
FIG. 6b: a sectional view of a fifth embodiment example of the recess according to the disclosure.
Figure 6C:
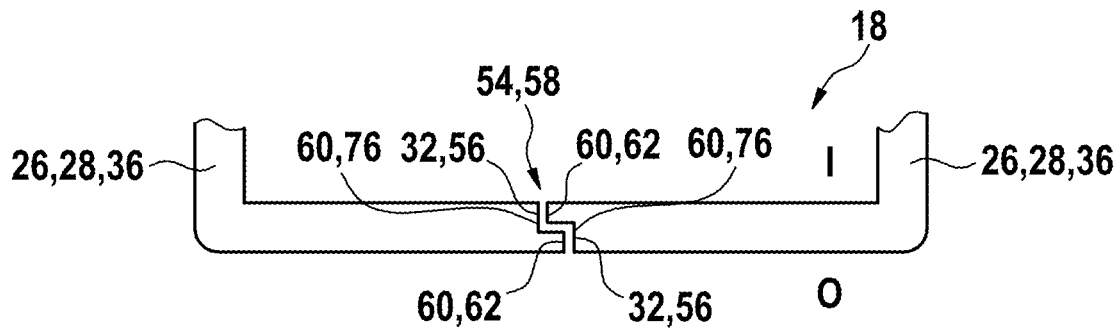
FIG. 6c: a sectional view of a sixth embodiment example of the recess according to the disclosure.

FIGS. 6a-6c show sectional views of three alternative embodiments for a tongue-and-groove system 60 according to the disclosure in the deformation region 58 of the two housing parts 26 of the hand-held processing tool 12. The housing parts 26 can—as previously described for the drill hammer 10—be designed as half-shells 28 or handle shells 36, but also as half-shell-shaped motor or gearbox housings or the like. The recesses 56 of the side edges 32 of the two housing parts 26 form at least partially, preferably completely, the tongue-and-groove system 60, in which a first of the two housing parts 26 in the deformation region 58 has the tongue 62 and a second of the two housing parts 26 has a groove 74 complementary thereto such that the tongue 62 and groove 74 are overlapping and spaced apart from one another in the assembled state of the housing 18. Here, an overlap of tongue 62 and groove 74 should be understood to mean that the tongue-and-groove system 60 does not allow a clear view from the exterior (O) of the assembled housing 18 into its interior (I). By spacing the tongue 62 and groove 74 apart, any compressive stresses in the deformation region 58 between the housing parts 26 can be effectively avoided.

Finally, it should be noted that the embodiment example shown is not limited to FIGS. 1 to 6c, nor to the designs of the drill hammer 10. As mentioned hereinabove, the disclosure can be used for very different hand-held processing tools 12, some of which have different housings 18. Moreover, it is not limited to battery-powered processing tools 12, but can also be applied without restriction to mains-operated or completely currentless, hand-held processing tools 12. As mentioned at the beginning, the decoupling geometry according to the disclosure in the at least one partial region 54 allows optimization of the vibration behavior both in the direction of the side edges 32 of the adjoining housing parts 26 and in all other conceivable directions, depending on the length, depth and design shape of the recess 56. The final design shape thus depends largely on the geometry and the movement behavior of the housing parts 26 of the hand-held processing tool 12. It is also possible to adapt to the compressive stress regions or the deformation region 58.

What is claimed is:

1. A hand-held processing tool comprising a housing that includes at least two housing parts, wherein:
   the at least two housing parts include two half shells,
   the two half shells each have a side edge which, in an assembled state of the housing, are directly adjacent to one another, and
   a recess is provided in at least one partial region of the side edges of at least one of the two half shells in such a way that the side edges of the two half shells are spaced apart from one another in the at least one partial region.

2. The hand-held processing tool according to claim 1, wherein the at least one partial region is a deformation region which is configured to deform elastically during operation of the hand-held processing tool.

3. The hand-held processing tool according to claim 1, wherein the recess is at least partially filled with a soft component.

4. The hand-held processing tool according to claim 1, wherein the recess is formed at least partially as a tongue-and-groove system in which a first of the two half shells has a tongue in the at least one partial region and a second of the two half shells has a groove complementary to the tongue in such a way that tongue and groove overlap and are spaced apart from one another in the assembled state of the housing.

5. The hand-held processing tool according to claim 1, wherein at least one screw connection of the two half shells in the vicinity of the at least one partial region is tightened with a lower torque in relation to the screw connection of the two half shells away from the at least one partial region.

6. The hand-held processing tool according to claim 1, wherein the two half shells are each partially designed as handle shells which form a handle that is configured to guide the processing tool.

7. The hand-held processing tool according to claim 1, wherein the hand-held processing tool is designed as a drill hammer.

8. The hand-held processing tool according to claim 1, wherein the recess is at least partially filled with an elastomer.

9. The hand-held processing tool according to claim 1, wherein the recess is completely filled with an elastomer.

10. The hand-held processing tool according to claim 1, wherein the recess is formed completely as a tongue-and-groove system in which a first of the two half shells has a tongue in the at least one partial region and a second of the two half shells has a groove complementary to the tongue in such a way that tongue and groove overlap and are spaced apart from one another in the assembled state of the housing.

11. A hand-held processing tool comprising a housing that includes at least two housing parts, wherein:
the at least two housing parts each have a side edge which, in an assembled state of the housing, are directly adjacent to one another,
a recess is provided in at least one partial region of the side edges of at least one of the two housing parts in such a way that the side edges of the at least two housing parts are spaced apart from one another in the at least one partial region,
a first housing part of the at least two housing parts has a plurality of screw boss and at least one second housing part of the at least two housing parts has a corresponding plurality of screw sockets for a screw connection of the at least two housing parts, and
in the assembled state of the housing, at least one screw boss and a corresponding screw socket have a defined clearance in the vicinity of the at least one partial region.

12. The hand-held processing tool according to claim 11, wherein a soft component is arranged between the at least one screw boss and the corresponding screw socket in the vicinity of the at least one partial region.

13. The hand-held processing tool according to claim 11, wherein the at least two housing parts of the housing are designed as half shells.

14. The hand-held processing tool according to claim 11, wherein an elastomer is arranged between the at least one screw boss and the corresponding screw socket in the vicinity of the at least one partial region.

15. The hand-held processing tool according to claim 11, wherein the at least one partial region is a deformation region which is configured to deform elastically during operation of the hand-held processing tool.

16. The hand-held processing tool according to claim 11, wherein the recess is at least partially filled with a soft component.

17. The hand-held processing tool according to claim 11, wherein the recess is formed at least partially as a tongue-and-groove system in which a first of the at least two housing parts has a tongue in the at least one partial region and a second of the at least two housing parts has a groove complementary thereto in such a way that tongue and groove overlap and are spaced apart from one another in the assembled state of the housing.

18. A hand-held processing tool comprising a housing that includes at least two housing parts, wherein:
the at least two housing parts each have a side edge which, in an assembled state of the housing, are directly adjacent to one another,
a recess is provided in at least one partial region of the side edges of at least one of the two housing parts in such a way that the side edges of the at least two housing parts are spaced apart from one another in the at least one partial region,
a first housing part of the at least two housing parts has at least one latching hook in the vicinity of the at least one partial region, and at least one second housing part of the at least two housing parts has a rear engagement corresponding to the at least one latching part, and
the at least one latching hook and the rear engagement have a defined clearance in the assembled state of the housing.

19. The hand-held processing tool according to claim 18, wherein the at least one partial region is a deformation region which is configured to deform elastically during operation of the hand-held processing tool.

20. The hand-held processing tool according to claim 18, wherein the recess is at least partially filled with a soft component.

* * * * *